United States Patent [15] 3,652,979
Angelle [45] Mar. 28, 1972

[54] INSTALLATION FOR THE TRANSMISSION OF MULTIPLEXED SEISMIC SIGNALS

[72] Inventor: Philippe Angelle, Thouare, France

[73] Assignee: Compagnie Generale De Geophysique, Paris, France

[22] Filed: Mar. 5, 1970

[21] Appl. No.: 16,704

[30] Foreign Application Priority Data

Mar. 5, 1969 France...................................6906077

[52] U.S. Cl.............................. 340/15.5 MRC, 340/18 CM
[51] Int. Cl..........................................................G01v 1/34
[58] Field of Search..............................340/18 CM, 15.5 MC

[56] References Cited

UNITED STATES PATENTS

| 3,311,876 | 3/1967 | Lee | 340/18 CM |
| 3,118,127 | 1/1964 | Savage | 340/18 CM |
| 3,239,803 | 3/1966 | Godbey | 340/17 |
| 3,457,544 | 7/1969 | Miller et al. | 340/18 CM |

Primary Examiner—Samuel Feinberg
Assistant Examiner—N. Moskowitz
Attorney—Oberlin, Maky, Donnelly & Renner

[57] ABSTRACT

The electrical signals from different seismological pick-ups are recorded at a central recording unit by switching the units in succession to a single two wire transmission line. Switching is controlled by pulses transmitted on the line and by coding the pulses appropriately, e.g., pulse number coding or pulse pattern coding, the pick-ups can be switched at times such that the signals therefrom arrive at the central unit in any desired time sequence.

10 Claims, 7 Drawing Figures

INSTALLATION FOR THE TRANSMISSION OF MULTIPLEXED SEISMIC SIGNALS

The present invention concerns the seismic study of subterranean formations.

It is known that in its principle this technique is based on the detection of echoes sent back by the studied subterranean formations after a certain number of explosive charges, previously placed in position, have been fired.

To do this, it is conventional to arrange on the surface of the ground a certain number of vibration pick-ups ("geophones"), and to transmit the seismic signals appearing in these pick-ups to a central recording unit (recording truck). In the simplest case, 24 pick-up groups are used in this connection, but the present tendency is to extend the number of pick-up groups for increasing the accuracy of the observations; thus 48 or even 96 pick-up groups are used. In each group, the different pick-ups are conventionally connected in series, in parallel, or in series-parallel, depending on the type of apparatus used. Throughout the following description, to simplify the explanation, reference will be made to pick-ups only, it being well understood that these may be either single pick-ups, or groups of pick-ups.

The invention concerns an improved installation for the transmission of the electrical signals of different pick-ups to a central recording unit.

For such installations, the prior art provides a plurality of individual transmission lines connecting each pick-up to the central recording unit. The various lines thus arriving at this central unit are connected to a multiplexing system in which the signals of the different pick-ups are time-multiplexed, that is to say, they are switched successively to a single transmission line, the central recording unit comprising after the multiplexing system an amplifier for the multiplexed signals, a digital analogue converter, a coder and finally a magnetic tape recorder.

Installations of this kind give satisfaction in the case of a small number of pick-ups. Multiplexing the signals of pick-ups, which are low-level signals of a few microvolts, does not give rise to any particular problem. It is still necessary to have a number of transmission lines equal to the number of pick-ups, and consequently such an installation becomes difficult to use when it is desired to use a larger number of pick-ups.

One of the aims of the invention is to provide an installation of the aforesaid type, in which the signals of the different pick-ups are transmitted to the central recording unit by means of a single transmission line, such improved installation being suitable for the use of a large number of pick-ups.

Another aim of the invention is to provide an installation of the aforesaid type, in which the operator can select the pick-ups whose signals are multiplexed for final recording.

Another aim of the invention is to provide an installation of the aforesaid type, in which the arrival of the signals at the central recording unit is effected independently of the relative position of the pick-ups producing them, and independently of the propagation times of the signals over the single transmission line.

Another aim of the invention is to provide an installation of the aforesaid type, in which the connection of the different pick-ups to the single transmission line is effected by means of assemblages or connecting boxes which are identical with each other.

According to the essential feature of the invention, an installation comprises a single transmission line of the coaxial cable type or two-wire protected cable, a pulse generator being connected to the line end opposite the central recording unit, each pick-up being connected to the intermediate line of an assemblage or box comprising a multiplexing element including electronic gates for establishing communication between the pick-up and the line, and a decoding element for controlling the opening of the said gates, such that the pulses from the generator control in sequence and with delay the passage of the pick-up signals to the line so that these signals arrive at the central recording element according to a multiplexing sequence corresponding to the sequence of the control pulses.

The effect of propagation times is thus radically suppressed.

In one embodiment of the invention, the sequence of pulses includes a series of successive identical pulses comprising a number of pulses equal to the number of pick-ups, the decoding element comprising a decoder controlled by a counter which counts the number of pulses received.

In another embodiment, the pulse generator transmits in sequence to the various pick-ups, complex groups of pulses representing the addresses of the pick-ups, each pick-up being connected to a decoding circuit capable of opening the gates of the multiplexing element on receipt of the address.

In another embodiment, the pick-ups are connected to the line by assemblages or boxes, which are all of identical structure and which, on connection of the pick-ups to the line, do not incorporate any address specifically related to the rank of the connection. Prior to the recording stage of the multiplexed seismic signals, there is an automatic addressing stage, in the course of which the assemblages receive pulses transmitted by the central recording unit and by the pulse generator, such that each assemblage stores a specific address of its connection rank. Once each assemblage has thus been allocated an address, this address corresponding necessarily and without possible error to the rank of the assemblage relative to the line, the multiplexed recording operation may take place without difficulty.

Preferably, the pulse generator is remote-controlled from the central recording unit by means of the single transmission line.

Preferably also, the electrical supply to the various elements connected to each pick-up takes place from the central recording unit by means of the single transmission line; advantageously a DC voltage is transmitted either in common mode between the two-wire line and its protective covering or, if the line has double protective covering, between its two protective coverings.

The following description and the accompanying drawings, given as non-restrictive examples, will enable the manner in which the invention is put into practice to be better understood. In the accompanying drawings.

Figure 1:
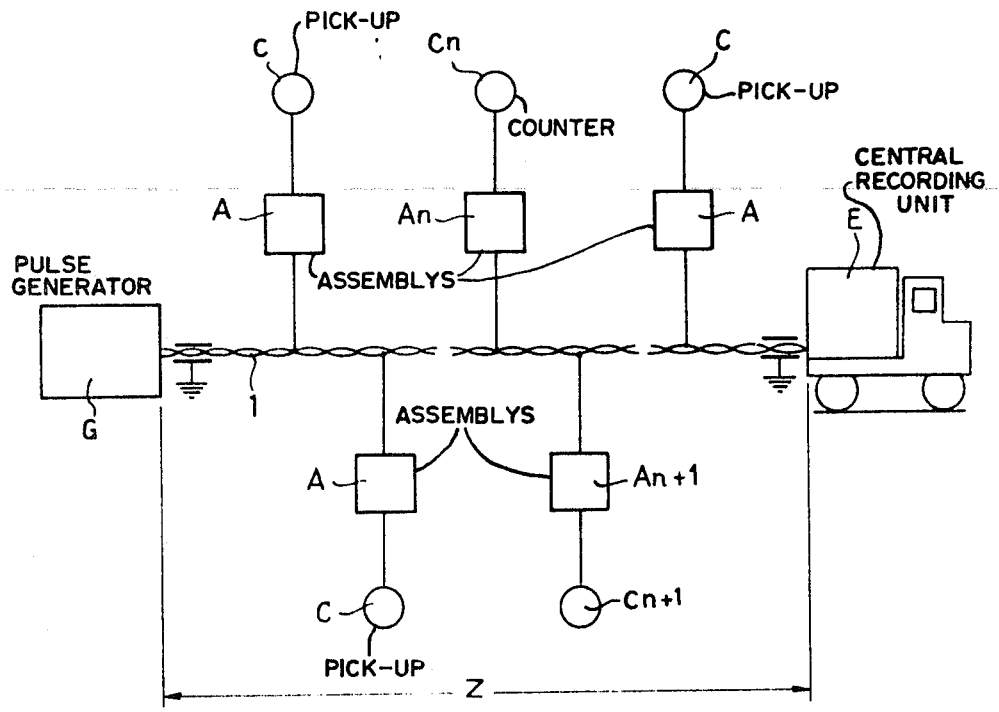
FIG. 1 shows diagrammatically an installation according to the invention.

The function of the installation shown in FIG. 1 is to transmit in time-multiplexed form to a central recording unit E the signals of a large number of pick-ups C, regularly distributed in a linear zone Z (as explained in the foregoing, a pick-up C could equally well be a group of pick-ups). To simplify the description, it will be assumed that there are 250 pick-ups C regularly distributed over a distance Z equal to 300 meters.

According to the invention, the transmission installation comprises a single transmission line connecting the recording unit E to a pulse generator G arranged at the opposite end of the line to E. The line 1 may be formed by a protected two-wire cable whose two wires are, in manner known per se, twisted so as to protect them from both electrical and magnetic disturbing fields.

The generator G supplies cyclically pulses having the following characteristics (FIG. 2):

duration of the cycle (by way of example) 2,000 μs.
number of pulses: equal to that of the pick-ups, in the case in point 250; the pulses have a duration of several tenths of μs and have a spacing of 8 μs.

successive trains of pulses separated by a group of three zero-resetting pulses $i$.

Figure 3:
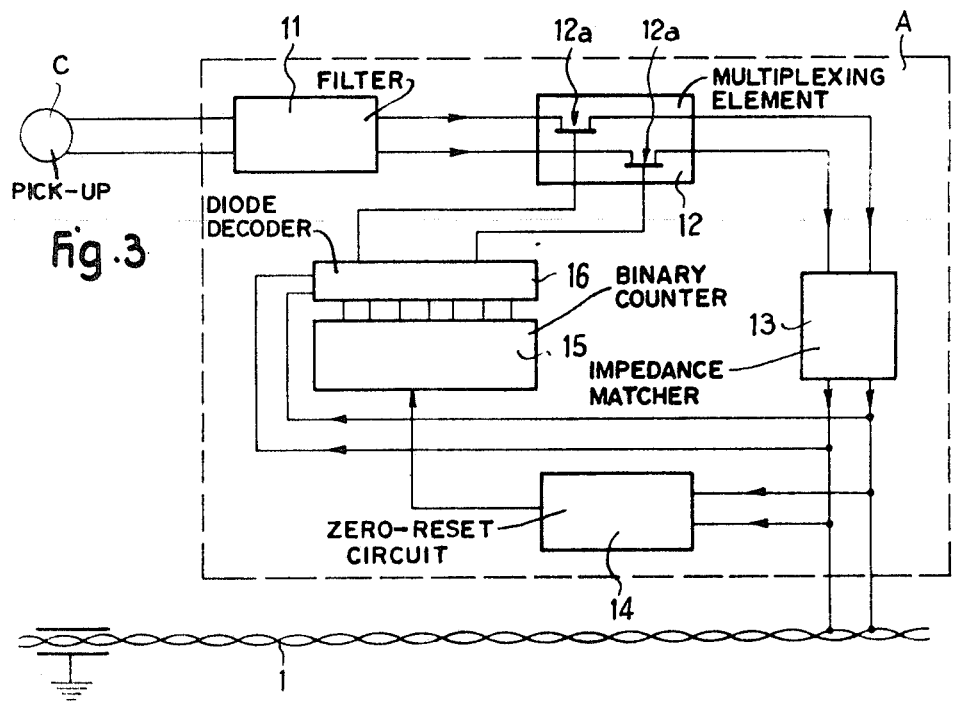
FIG. 3 illustrates the assemblage connected to each pick-up.

Furthermore, each pick-up C is connected to the transmission line by an assemblage A. As shown in FIG. 3, each assemblage A comprises the following elements:

low-frequency and high-frequency filters 11 connected to the pick-up line; the LF filters are used in particular for intercepting the seismological background noise and the HF filters are indispensible for suppressing any frequency higher than half the sampling frequency (250 c./s. in the example selected), a multiplexing element 12 comprising as electronic gates two field effect transistors 12$a$, an impedance matcher 13 for connection to the two-wire line 1, a zero-resetting circuit 14 connected to the two-wire line. The function of this circuit is to decode the three-pulse group $i$ which appears on the line every 2 ms., an eight bit binary counter 15 (capacity 255) controlling a diode decoder 16, prewired for a certain number present in the counter for which number the decoder controls the opening of the gates 12$a$.

The counter 15 is supplied with the line pulses which are short enough not to be confused with the sampled seismic signals. The circuit 14 produces zero resetting of the counter 15 every 2 ms.

The supply of the assemblage of boxes A and pulse generator G may be produced from the central recording unit by sending a DC voltage either in common mode voltage between the two-wire line and its shields or between two insulated shields of the line (if the latter has a double shield).

Figure 2:
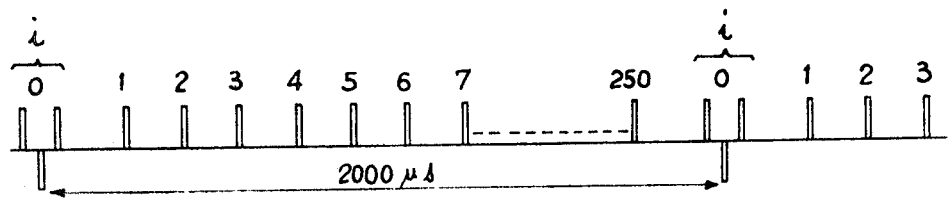
FIG. 2 illustrates in a particular embodiment, the shape of the train of pulses transmitted by the pulse generator.
Figure 4:
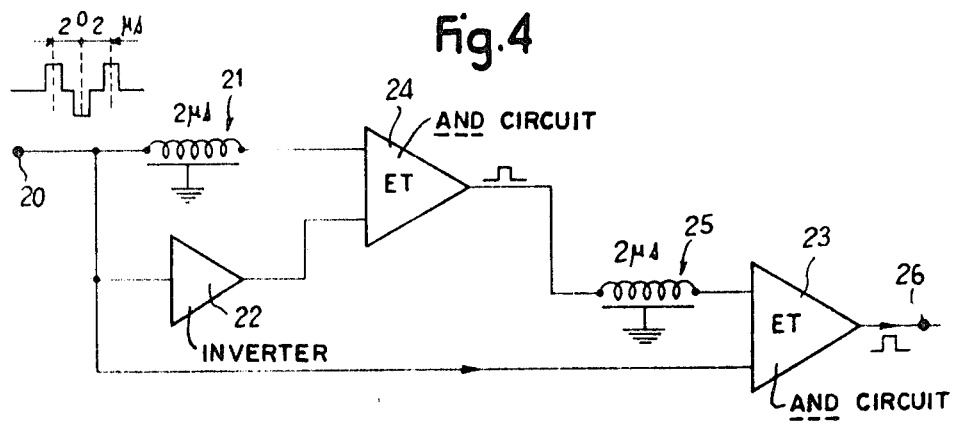
FIG. 4 illustrates a zero-resetting circuit forming part of the said assemblage.

FIG. 4 shows the details of the zero-resetting circuit 14, associated with the assemblage of each pick-up. As explained in the foregoing, this circuit is used for decoding the three pulses $i$ appearing at the commencement of each cycle of the pulse generator. The pulses $i$ are spaced apart by 2 $\mu$s., as shown in FIG. 2. For decoding the pulses $i$, the zero-resetting circuit comprises an input 20 connected respectively to a delay line 21 (delay 2 $\mu$s.), to an inverter 22 and to an AND-circuit 23. Opposite the input 20, the delay line 21 and the inverter 22 are connected to a second AND-circuit 24. The output of 24 is connected to an input of 23 by means of a second delay line 25 introducing a delay of 2 $\mu$s. The output 26 of the circuit 23 forms the output of the device. It will be seen that in such a zero-resetting system, the first pulse is applied to the delay line 21 and then to the AND-circuit 24, while the second pulse, inverted by 22, rejoins the first pulse so that the output of 24 definitely corresponds to the occurrence of a negative pulse 2 $\mu$s. following a positive pulse. The third pulse is applied directly to the AND-circuit 23, to which is also applied the output of 24 after passage through the delay line 25. Under these conditions, the appearance of a signal at 26 corresponds and corresponds solely to the specific occurrence of the three pulses $i$.

The mode of operation of the installation is easy to understand: Before firing the explosive charges, the operator connects the supply voltage to the generator G and to the assemblages A by means of the line 1 from the central unit E (recording truck). The generator G delivers pulses cyclically, the first train of pulses delivered resetting to zero all the counters 15, counting cyclically in synchronism from 0 to 250, by opening successively the gates of the multiplexing elements 12.

The assemblage A$n$ connected to the counter C$n$ of rank $n$, has the gates 12 $an$ of its multiplexing element 12$n$ opened for the pulse $n$. The time taken by the to arrive at A$n$ being $tn$, and the time taken by the said pulse to travel from A$n$ to E being $t'n$, we have:

$tn + t'n = K$, K being a constant independent of $n$.

On firing, the time taken by the signal of the pick-up C$n$ to arrive at E is $t'n + E$, E being a very small delay, due to the switching time in the assemblage A$n$; this delay is the same for all the assemblages.

Figure 5:
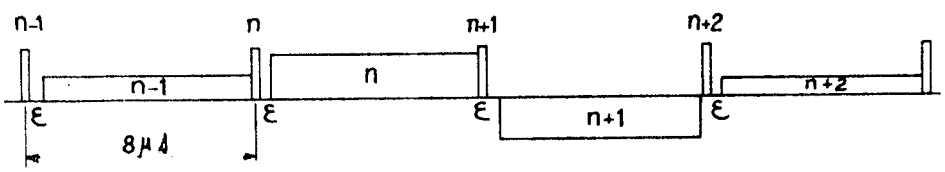
FIG. 5 illustrates the transmission of the pick-up signals.

As shown in FIG. 5, the result is that the arrival of the "sampled" signals of the pick-ups at the unit E takes place in synchronism with the pulses. Due to this, the installation according to the invention is not subjected to the influence of the propagation times of the signals over the line.

The recording unit E comprises a circuit identical with the zero-resetting circuit of the assemblages A, thus making it possible to reconstitute a pulse of the multiplexing cycle commencement.

The first of these pulses, after the order to fire, triggers seismic recording an magnetic tape after passing through a single amplifier (with binary gain for example), and an analogue-numerical converter, these elements of the installation being conventional.

In some cases, instead of the signals of the 250 pick-ups, it is necessary to record only a fraction of this number, for example 50, shifted by a certain amount at each firing. The pulse generator then preferably no longer produces a single pulse per pick-up, but a true address comprising eight bits in series distributed over a small fraction of the elementary multiplexing cycle (for example within 2 $\mu$s. on the 8 $\mu$s. of cycle).

The operator selects on this generator the initial address and the number of pick-ups to be multiplexed in 2 ms. (50 in the example selected). Each assemblage A no longer contains a zero-resetting circuit and counter, but a decoding circuit for the address $n$ controlling the opening of the gates of the multiplexing system.

As a modification, the pulse generator produces a single pulse for each pick-up, but the synchronising pulse (three pulses separated by 2 $\mu$s.) is followed by the address $n$ of the first pick-up to be multiplexed. In this case, the zero-resetting circuit of each assemblage A is replaced by an $n$-resetting circuit, $n$ being the address concerned.

In both cases, the addressing operations are advantageously remote-controlled from the recording unit; by remote control the operator is able to modify the addressing parameters (number of the first pick-up and the number of the pick-ups to be multiplexed in 2 ms.) of the pulse generator situated at the other end of the line.

Figure 6:
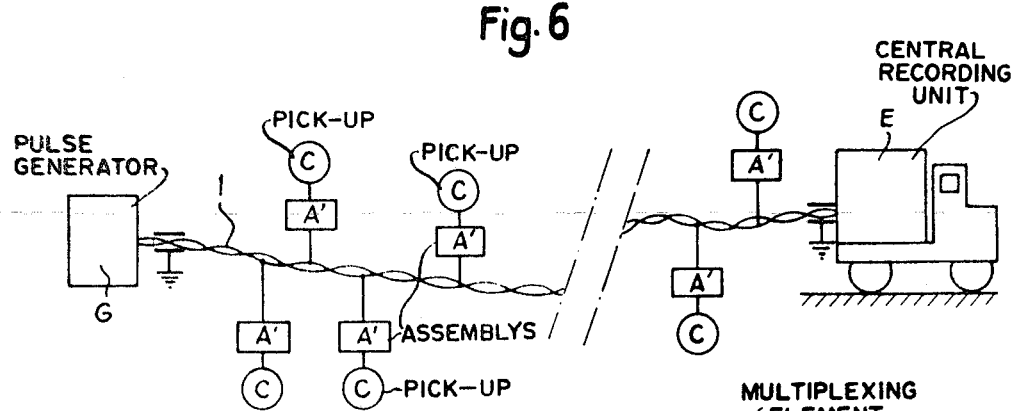
FIG. 6 shows diagrammatically an installation according to the present invention in an embodiment referred to as "automatic addressing" embodiment.

A description will now be given of the particular embodiment of FIGS. 6 and 7.

As before, a single transmission line 1 is connected between the central recording unit E and a pulse generator G arranged at the end of the line. The pick-ups C are connected to the line by means of the assemblages A', the different assemblages A' having an identical structure.

Before the seismic recording stage, there is a preliminary automatic addressing stage:

the central recording unit E transmits to the line a train of pulses called "commencement of automatic addressing pulses;"

this train of pulses is decoded by the generator G situated at the of the line, thereby triggering the transmission to the line by the generator of a second train of pulses called "end of automatic addressing pulses."

In the course of this preliminary stage, the assemblages A' store an address corresponding to their rank.

Figure 7:
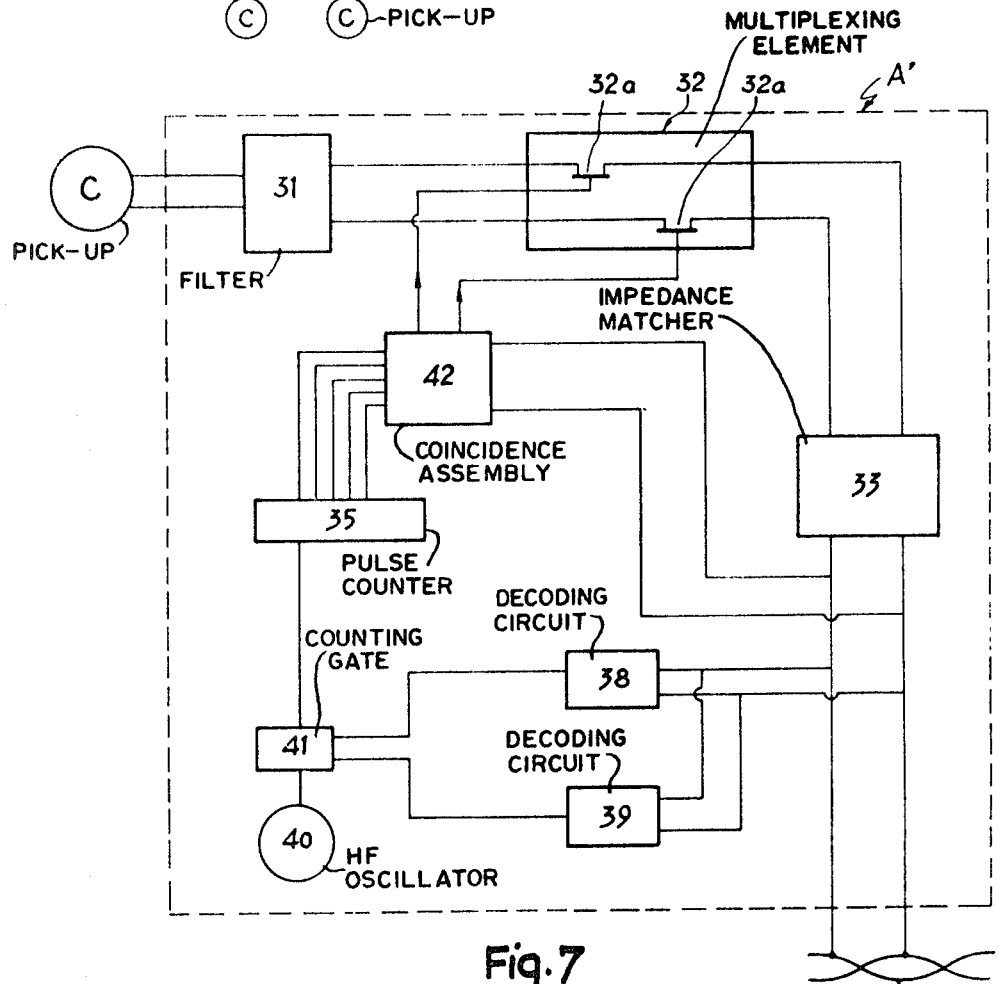
FIG. 7 shows the structure of the assemblage connected to each pick-up according to this last embodiment.

For this purpose, as will be seen in FIG. 7, each assemblage A' comprises the following component elements:

a filtering assemblage 31, similar to the aforesaid assemblage 11;

a multiplexing assemblage 32 comprising electronic gates, for example, two field effect transistors 32$a$; the assemblage 32 is thus similar to the aforesaid element 12;

an impedance matcher 33 for connection to the line 1 which, in the example selected, is a two-wire line;

a circuit 38 for decoding the train of commencement of addressing pulses;

a circuit 39 for decoding the train of end of addressing pulses;

a high-frequency quartz oscillator 40;

a pulse counter 35, receiving the pulses from the oscillator 40 through a counting gate 41, this gate being opened by the decoding of the train of commencement of automatic addressing pulses (that is to say, by the output signal from 38), and closed by the decoding of the train of end of automatic addressing pulses (that is to say, by the output signal from 39);

a coincidence assemblage 42, making a comparison between the address pulses supplied in the recording stage and the contents of the counter 35, for transmitting, on coincidence, signals controlling the opening of the gates 32a.

As before, electrical supply of the elements A' is provided by the central recording unit, by means of the signal transmission line; advantageously a DC voltage is transmitted, either a voltage of common mode between the two-wire line and its protective covering or, if the line is a line having double protective coverings, between its two protective coverings.

The mode of operation of the installation is easy to understand:

In the course of the preliminary addressing stage, each assemblage A' determines the time elapsing between the trains of "commencement" and the "end of addressing" pulses, which it receives by its circuits 38 and 39. This time corresponds to double the propagation time on the line from the assemblage A' to the generator G situated at the end of the line, to which it is necessary to add the response time of the generator, which is constant. For each assemblage A', this time is a linear function of the position of the assemblage on the line 1 relative to the generator G.

The frequency of the quartz counting oscillator 40 of each assemblage A' is selected such that the contents of the counters 35 at the end of automatic addressing differ by at least one unit for two adjacent assemblages A'.

By way of example, if the minimum distance between two adjacent assemblages A' is about 10 m. this frequency is such that at least one unit is counted during the propagation time on 20 m. of line, i.e., a duration of 0.1 microsecond (dielectric constant of the line = 2.26). The frequency is therefore at least 10 mc./s.

Thus, each assemblage A' stores in its counter 35 a specific address different from the address of all the other assemblages.

In the seismic recording stage, the pulse generator G as before transmits trains of address pulses, each address differing from the preceding address by at least one unit.

It should be noted that there may be any distance whatsoever between assemblages A', provided that a certain minimum distance is maintained between two adjacent assemblages A' as a function of the frequency of the oscillators 40. If, for example, the assemblages A' are connected, with a minimum interval of 10 meters, to a line 3,000 meters long, the frequency of the oscillators 40 should 10 mc./s. and the counters 35 should have a capacity of 3,000/10 = 300 units. The various multiplexing instants then correspond to successive 10 meter lengths along the line.

If the distance between two assemblages A' is variable along the line, while remaining greater than the required minimum, some multiplexing instants will not correspond to any assemblage A', which has no practical importance or consequence.

It will be appreciated that automatic addressing has the very considerable advantage of not requiring anything specific in the connection of the assemblages to the line, since it is after connection that these assemblages are assigned an address which is then necessarily exact.

The embodiments of the invention in which an exclusive Property or Privilege is claimed are defined as follows:

1. An installation for the transmission to a central recording unit of electrical signals from different geophones spread on the ground along a recording zone or groups of geophones of seismological vibrations, this transmission installation being characterized in that it comprises a pulse generator and a single transmission line disposed in the zone of the geophones between the central recording unit and the pulse generator connected at the end of the line, and a plurality of connecting assemblages, each geophones being connected to the line by a corresponding assemblage comprising a multiplexing element including electronic gates for establishing communication between the geophones and the line, and an element for controlling the opening of the said gates in response to the specific reception of pulses from the pulse generator, such that the signals arrive at the central recording unit according to a multiplexing sequence corresponding exactly to the pulse emission sequence of the generator.

2. An installation according to claim 1, characterized in that the generator is designed to transmit trains of successive identical pulses in number equal to that of the pick-ups, the element controlling the opening of each assemblage being connected to a pulse counter.

3. An installation according to claim 1, characterized in that the generator is designed to transmit in sequence complex pulse groups representing the addresses of the different pick-ups, each assemblage of each pick-up comprising a decoding circuit adapted to open the gates of the multi-plexing element on reception of the corresponding address group.

4. An installation according to claim 1, characterized in that each connection assemblage comprises means for the preliminary storage of a specific coded address, representative of its order of connection to the line, as well as coincidence means such that the opening of its multiplexing gates will be effected by coincidence of the stored address and of the pulses which the assemblage receives from the generator in the course of the recording stage.

5. An installation according to claim 4, characterized in that the storage means comprise an oscillator connected to a counter by means of an electronic gate, this gate being open on reception of a train of pulses transmitted by the central recording unit, then closed on reception of a second train of pulses transmitted in return by the generator on reception of the first train of pulses.

6. An installation according to claim 5, characterized in that the generator is designed to transmit trains of successive identical pulses in number equal at least to that of the pick-ups, and in that the frequency of the oscillators is selected such that the address stored by the counter of each assemblage differs at least by one unit from the address of the adjacent assemblages.

7. An installation according to claim 1, characterized in that the electrical supply of each assemblage is effected from the central recording unit by means of the transmission line.

8. An installation according to claim 1 characterized in that the pulse generator is remote controlled from the central recording unit by means of the transmission line.

9. An installation according to claim 1, characterized in that the transmission line is a coaxial cable.

10. An installation according to claim 1, in which the transmission line is a two-wire protectively covered cable.

* * * * *

UNITED STATES PATENT OFFICE
CERTIFICATE OF CORRECTION

Patent No. 3,652,979                    Dated March 28, 1972

Inventor(s) PHILIPPE ANGELLE

It is certified that error appears in the above-identified patent and that said Letters Patent are hereby corrected as shown below:

It is requested that in Fig. 3 the lead lines from impedance matcher 13 be directed to binary counter 15, rather than to diode decoder 16, as illustrated.

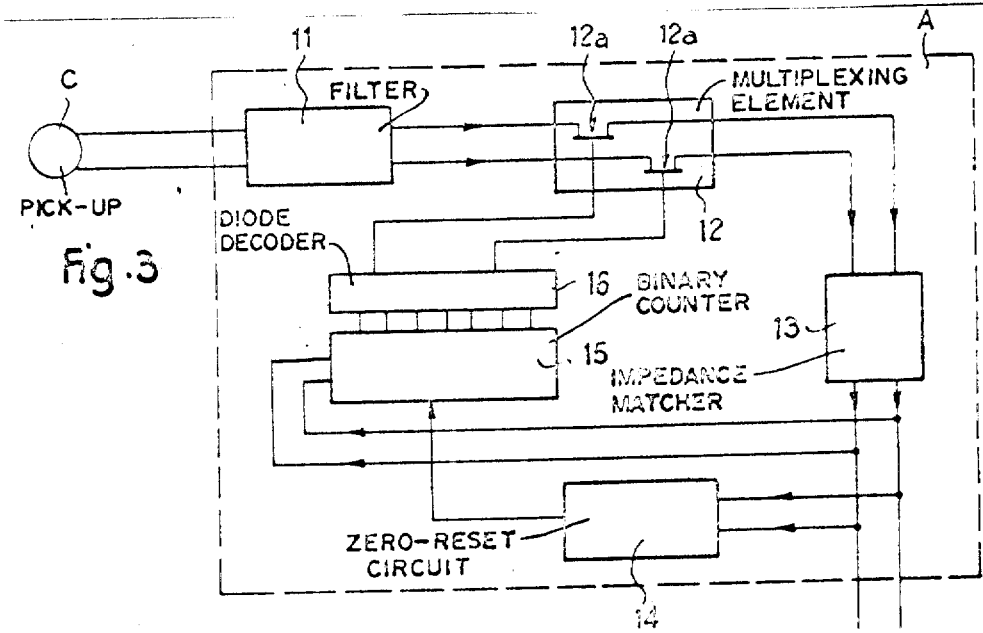

Signed and sealed this 25th day of December 1973.

(SEAL)
Attest:

EDWARD M. FLETCHER, JR.
Attesting Officer

RENE D. TEGTMEYER
Acting Commissioner of Patents